United States Patent
Hayes

Patent Number: 6,046,567
Date of Patent: Apr. 4, 2000

[54] STEPPER MOTOR DRIVE SYSTEM

[75] Inventor: Jeffrey Hayes, Camarillo, Calif.

[73] Assignee: Datron/Transco, Inc., Simi Valley, Calif.

[21] Appl. No.: 09/219,001

[22] Filed: Dec. 21, 1998

[51] Int. Cl.[7] .................................................. H02P 8/00
[52] U.S. Cl. ......................... 318/696; 318/696; 318/603
[58] Field of Search .................................. 318/685, 696, 318/603

[56] References Cited

U.S. PATENT DOCUMENTS

| | | | |
|---|---|---|---|
| 4,100,471 | 7/1978 | Pritchard | 318/685 |
| 4,117,356 | 9/1978 | Mansfield et al. | 310/49 |
| 4,297,625 | 10/1981 | Newell | 318/696 |
| 4,302,712 | 11/1981 | Pritchard | 318/490 |
| 4,349,771 | 9/1982 | Buxton | 318/685 |
| 4,420,717 | 12/1983 | Wallace et al. | 318/696 |
| 4,446,412 | 5/1984 | Friedman et al. | 318/696 |
| 4,477,756 | 10/1984 | Moriguchi | 318/696 |
| 5,003,948 | 4/1991 | Churchill et al. | 123/352 |
| 5,321,342 | 6/1994 | Kruse | 318/254 |
| 5,520,359 | 5/1996 | Merhav et al. | 244/158 R |
| 5,572,105 | 11/1996 | Nojima | 318/696 |

*Primary Examiner*—Robert E. Nappi
*Assistant Examiner*—Rina Duda
*Attorney, Agent, or Firm*—Edward A. Sokolski

[57] ABSTRACT

A device for driving a stepper motor in variable sized micro-steps in response to slew rate commands. The device integrates the slew rate commands, calculates the currents to be supplied to the windings of the stepper motor and supplies these currents to the stepper motor. The device utilizes an update frequency for the integration, calculation and supply of currents to the stepper motor that is higher than the frequencies of the predominant resonances of whatever system is being driven by the stepper motor. As a consequence, the size of each micro-step executed by the stepper motor in response to slew rate commands is larger for high slew rates and smaller for low slew rates.

2 Claims, 3 Drawing Sheets

STEPPER MOTOR DRIVE SYSTEM

BACKGROUND OF THE INVENTION a. Field of the Invention

This invention pertains to control systems for operating stepper motors in response to slew rate commands. More particularly, this invention pertains to control systems for driving stepper motors that are operated in a manner that subdivides each step of the stepper motor into multiple, small increments or micro-steps.

b. Description of the Prior Art

A stepper motor is a type of electrical motor that, at least in the early designs, moved in discrete steps instead of rotating in a continuous manner. Early designs for stepper motors typically utilized a rotor that was permanently magnetized and a stator having two current windings. The stator had a toothed structure that provided a substantial number of low reluctance magnetic paths through which the permanent magnetic field from the rotor could flow.

Because the stator had many pairs of opposing teeth, the rotor could take any one of many stable positions. The rotor of the stepper motor could be moved, or stepped, to adjacent stable positions by supplying current to one of the two stator windings, the direction of each step being determined by the polarity of the current supplied to the winding. By supplying a sequence of current pulses alternately to the two stator current windings, the rotor could be moved in steps from an initial stable position to a new stable position that was located many steps from the initial rotor position. For example, the rotor could be moved, or stepped, through four successive adjacent stable positions by applying a positive pulse of current to the first stator winding, followed by a positive current pulse to the second stator winding, followed by a negative current pulse to the first stator winding, followed by a negative current pulse to the second stator winding. This sequence of currents constitutes one cycle of a repetitive sequence of such currents that could be used to cause the stepper motor to rotate in either direction in as many steps as may be desired. For the purpose of describing the prior art and the present invention, the movement of the rotor through four adjacent steps by the application of appropriate currents to the windings is denoted as one stepping cycle of 360 degrees. In prior art designs, the rotor could move in as many as 200 steps in the course of making one complete revolution.

Because stepping motors provided a number of stable positions, such motors were well adapted for providing positioning control without need for position feedback devices because the total rotor movement is equal to the accumulation of individual rotor steps.

In order to reduce the size of the steps that could be achieved by the stepper motor, some subsequent designs for stepper motor drive systems, in effect, sub-divided the steps by supplying currents in controlled amounts and polarities to both stator windings simultaneously so as to generate a magnetic field that was oriented within the stator in an intermediate location between stator teeth so that the rotor would be driven to, and aligned in, a position that was located some fraction of the distance between adjacent stator teeth. This mode of moving the rotor to a position representing a fraction of a nominal step is known as micro-stepping.

FIG. 1 depicts the basic elements of a drive system for a stepper motor that could be used to position and hold the rotor at some micro-step position within a stepping cycle. The desired micro-position command for the rotor (within a stepping cycle of 360 degrees corresponding to four nominal stepping motor steps) is specified in terms of stepping cycle degrees. In response to the specification of the desired micro-position of the rotor, current calculator 11 calculates the current to be applied to stator winding 1 and current calculator 12 calculates the current to be applied to stator winding 2 that will cause the desired micro-positioning of the rotor within the adjacent four step range. The currents calculated by calculators 11 and 12 are then supplied by current generators 13 and 14 to the first and second stator windings of the stepper motor. The currents that are calculated by current calculators 11 and 12 are nominally proportional to the sine and cosine of the desired micro-step expressed in degrees ranging from 0 to 360 degrees over the one stepping cycle of 4 stepper motor steps. The calculation of the required currents may depart somewhat from the nominal sinusoids so as to adjust for various non-linearities arising from the angular dependencies of the flux path reluctance and from other factors. The calculation of the sine and cosine can be implemented by a digital computer or, more simply, by using a look-up table that contains a value for the sine and the cosine for each of the micro-steps.

Subsequent to the initial development and application of the stepper motors, such stepper motors were used not only to shift a device from one position to different a position, but in many applications were used to drive a device, such as a machine tool, a tracking antenna or other moveable device, from one position to successive positions in a continuous manner and at a controlled, variable rate.

FIG. 2 depicts a prior art device using micro-stepping for the control of a stepper motor that is used to turn, or slew, a device such as a machine tool or tracking antenna in response to turning rate, or slew rate, commands. In the prior art device a slew rate command that is generated by an external control system (e.g. a slew rate of 5 degrees per second) is converted by converter and pulse generator 21 into a corresponding number of pulses per second (e.g. 500 pulses per second), which converter and pulse generator then outputs electrical pulses at a corresponding rate. These pulses are then counted by digital counter 22 and the count is output to sine calculator 23 and cosine calculator 24. Current generators 25 and 26 then supply currents to the stepper motor stator windings in response to the values output by sine calculator 23 and cosine calculator 24. The output from counter 22 has a modulus that corresponds to one stepping cycle of 360 degrees, i.e. to the movement of the stepper motor rotor through 4 nominal stepper motor steps. For example, if the modulus for the counter is 100, then each pulse input to the counter represents 3.6 degrees of progression through a stepper cycle of four steps. The actual physical rotation of the rotor in response to each pulse is then equal to 3.6 degrees divided by the number of stepper cycles in one complete rotation of the rotor.

As depicted in FIG. 2, the prior art implementation of micro-stepping utilized a counter 22 to count input pulses. In order to command slewing in either direction, the pulses had a positive or negative directional sign associated with them so that upon the receipt of a pulse, counter 22 either incremented or decremented its count is accord with the slew direction. Each time that the pulse count that was output by counter 22 either increased or decreased by one, the nominal sine and cosine functions were recalculated and the corresponding currents were applied by the current generators to the stepper motor windings. This prior art design had two limitations.

First, because each time that a pulse was counted by counter 22, the new values of sine and cosine were calculated and new values of current were supplied to the stepper motor windings, the operational speed limits of the sine and cosine calculators and of the current generators placed an upper limit on the slew rate that could be provided by the stepping motor. One could, of course, raise the upper limit on the slew rate by increasing the size of the micro-steps, i.e. by reducing the number of micro-steps within each stepping cycle. Increasing the size of the micro-steps, however, decreased the positional accuracy that could be provided by the stepper motor.

Second, for certain critical slew rates, the pulse rate in the prior art device would correspond to a mechanical resonance of the device, such as an antenna, that was being slewed by the stepper motor. Because the stepper motor changed position in discrete micro-steps, at such critical pulse rates the micro-steps would induce undesirable mechanical vibrations in the system. The magnitude of the induced mechanical vibrations could be decreased by decreasing the size of the micro-steps, i.e. by increasing the number of micro-steps within each stepping cycle.

The basic problem with the prior art design depicted in FIG. 2, is that if the size of the micro-steps was increased so as to raise the maximum slew rate, this increase in the size of the micro-steps would exacerbate the mechanical vibrations. If the size of the micro-steps was decreased to reduce mechanical vibrations, the maximum slew rate was reduced.

To a limited extent the invention disclosed in U.S. Pat. No. 5,572,105 ("105") addresses the conflict in the prior art devices between providing high slew rates without the larger micro-steps inducing excessive mechanical vibrations. The "105" invention uses one size of micro-step for a range of low slew rates, a second, larger size of micro-step for a range of higher slew rates, a third, still larger size of micro-step for a range of still higher slew rates, etc. However, the "105" invention, does not change the size of the micro-steps in a continuous manner in response to the slew rate, but instead selects between a few pre-determined sizes of micro-steps in response to which range the slew rate lies within.

SUMMARY OF THE INVENTION

The present invention provides a system for driving a stepper motor in micro-steps that provides high slew rates without exacerbating mechanical vibrations. In contrast to the "105" invention, the present invention, in effect, continuously adapts the size of the micro-steps to the slew rate. The present invention uses an integrator to integrate the slew rate commands and a calculator or lookup table to determine the new values for winding currents and supplies the new values of current to the stepper motor at a fixed update rate that is substantially higher than the frequencies of the predominant mechanical resonances of the devices being slewed. The outputs of the integrator, of the sine and cosine current calculators and of the current generators are all updated at the fixed update rate. The size of the change in the stepper motor positioning with each new update, however, is not fixed. The change in positioning is determined by the change in the output of the integrator from one update to the next. As a consequence, when the slew rate is high, the size of the micro-steps is large, and when the slew rate is low, the size of the micro-steps is small. For both high and low slew rates, the micro-step positioning is always at a frequency that is higher than the mechanical resonances of the system.

DETAILED DESCRIPTION

Figure 3:
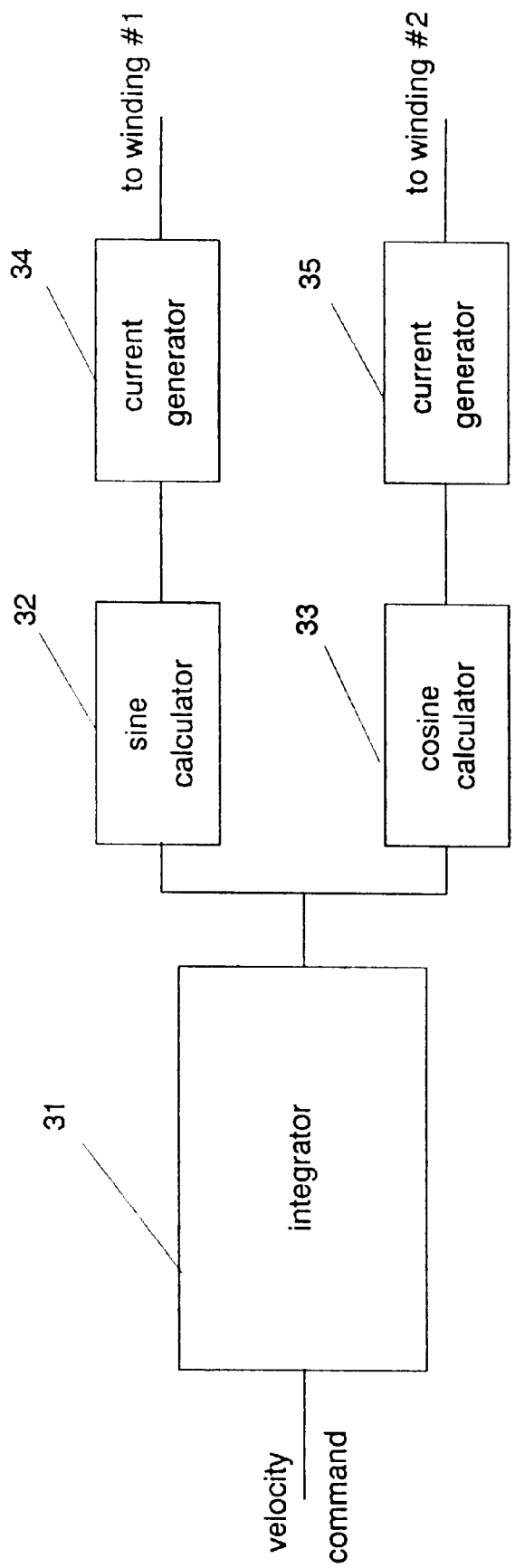
FIG. 3 is a schematic diagram of the present invention for driving and positioning a stepper motor in micro-steps of variable size depending upon the slew rate.

As depicted in FIG. 3, a velocity command is integrated by integrator 31 and the integral is output as a rotor positioning command specifying the rotor position in terms of its position within a stepping cycle of 360 degrees. The output of integrator 31 is updated at a fixed update rate and input to sine calculator 32 and cosine calculator 33. The velocity command may be expressed in terms of a number of degrees within a stepper cycle per second. If the velocity command is stated in some other unit, then integrator 31 would include the multiplication of the slew command by an appropriate scaling factor. Sine calculator 32 and cosine calculator 33 could be a digital calculator that calculates the sinusoidal functions, or could be simply a look up table. Sine calculator 32 and cosine calculator 33 calculate the values of functions that are nominally proportional to the sine and cosine of the output of integrator 31 where the output of integrator 31 is considered as varying over one cycle of 360 degrees for one stepping cycle of four steps. Although calculators 32 and 33 are described as performing calculations of sines and cosines, the values actually calculated will normally be scaled in magnitude and may include adjustments to compensate for various non-linearities and to adapt to or compensate for other characteristics of the stepper motor and the devices being driven by the motor. As such the sine and cosine calculators can be more generally described as current calculators that calculate the amounts of current that should be supplied to the stepper motor windings to cause the rotor to change position appropriately in response to the slew rate commands. The outputs from sine calculator 32 and cosine calculator 33 direct current generators 34 and 35 to supply the specified currents to the two stepper motor windings.

Figure 1:
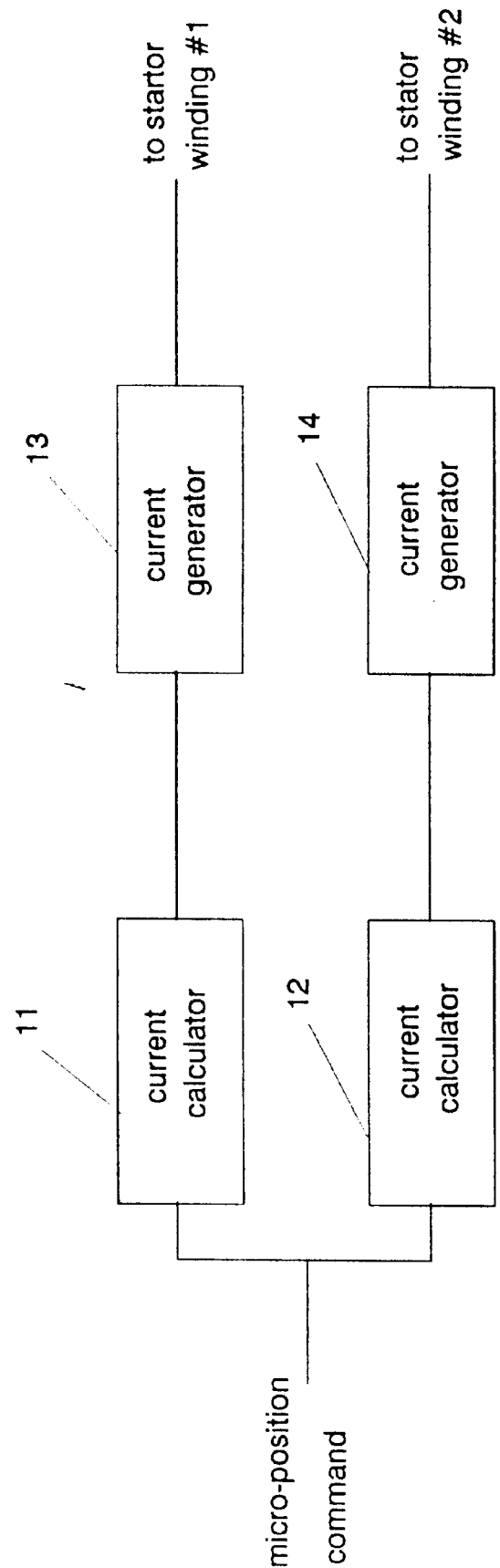
FIG. 1 is a schematic diagram of a system that may be used to position the rotor at a micro-step position.
Figure 2:
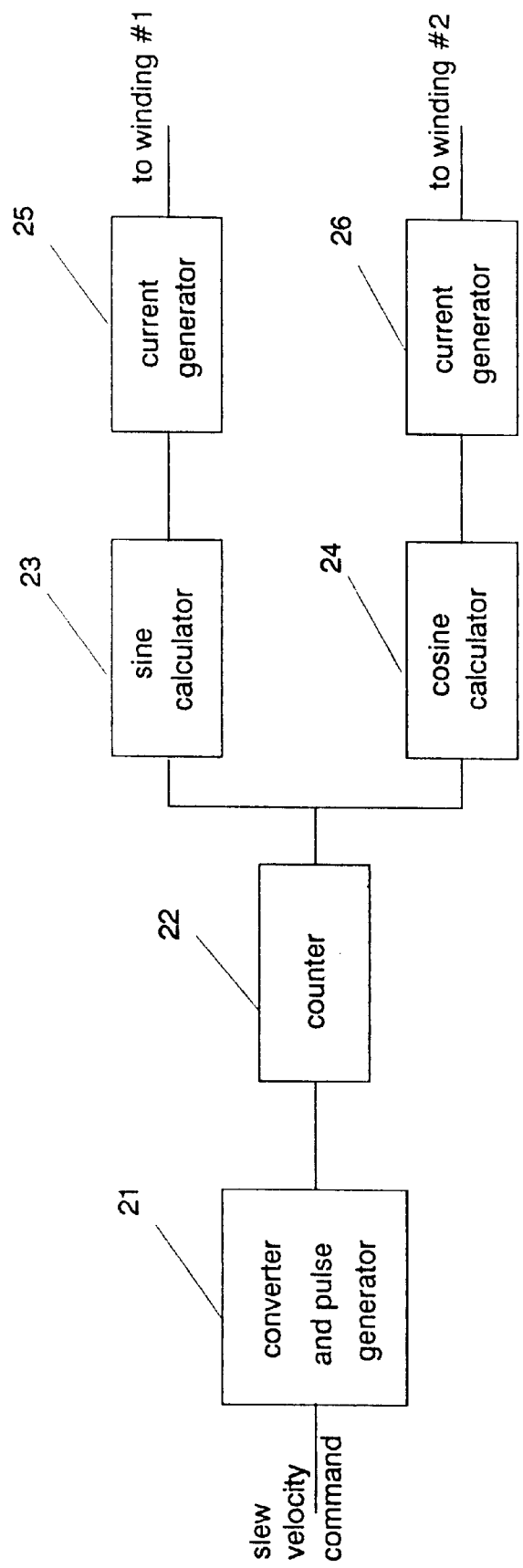
FIG. 2 is a schematic diagram of a prior art system for driving a stepper motor in micro-steps of fixed size in response to slew rate commands.

The output of integrator 31, the outputs of sine calculator 32 and cosine calculator 33 and the currents output by current generators 34 and 35 are all updated at the same update rate. The update rate is selected so as to be above the frequencies of the predominant mechanical resonances of the devices being driven by the stepper motor. The smallest size of the micro-steps is determined by the smallest change that the integrator provides in its output, or by the smallest change in the outputs from the sine and cosine calculators, or by the smallest change in currents that are provided by the current generators. Because the positioning of the stepper motor in this drive system is updated at the update rate, the size of the change in the position with each update is determined by the change in the output of integrator 31 with each update. As a consequence, at high slew rates each change in stepper motor positioning is large, and at low slew rates, each change in stepper motor position is small. Thus the present invention, in effect, changes the size of the micro-step in a continuous manner in response to the slew rate. As a consequence the present invention avoids the upper limitation on slew rates that existed in the prior art device of FIG. 2, while, at low slew rates retaining the ability to move in small micro-steps limited in size only by the resolutions of the integrator, the sine and cosine calculators and the current generators. Whether at high slew rates or at low slew rates the positioning is updated at a rate that exceeds the frequencies of the predominant mechanical resonances of the system.

It should be understood that although FIG. 3 depicts the integrator and the sine and cosine calculators as separate items, the functions performed by these separate items could be performed by a single device such as a digital computer.

It should also be understood that calculations of the sines and cosines could be performed in different ways, e.g. by a series of calculations performed by a digital computer, or by using a look-up table.

Although the preferred embodiment is described as using a fixed update rate, this rate need not be fixed. However, to avoid exacerbating mechanical resonances, the update rate should always be higher than the frequencies of the predominant mechanical resonances of the device being driven by the stepper motor.

I claim:

1. A device for driving a stepper motor in response to slew rate commands, the stepper motor having a rotor and having first and second stator windings, the device comprising:

an integrator that receives the slew rate commands as an input and outputs a rotor positioning command, first and second current calculators that calculate the magnitude and sign of first and second currents that are to be supplied to the first and second stator windings in response to the rotor positioning command, first and second current generators that supply first and second currents having variable magnitude and sign to the first and second stator windings respectively in response to the outputs of the first and second current calculators, wherein the first and second current calculators and the first and second current generators have update frequencies in excess of any predominant mechanical resonances of a system being driven by the stepper motor.

2. A method for driving a stepper motor in response to slew rate commands, the stepper motor having a rotor and having first and second stator windings, the method comprising:

integrating the slew rate commands to obtain and output a rotor positioning command, calculating the magnitude and sign of first and second currents that are to be supplied to the first and second stator windings in response to the rotor positioning command, and generating and supplying the first and second currents having variable magnitude and sign to the first and second stator windings.

wherein the integrating, the first and second current calculating and the first and second current generating have update frequencies in excess of any predominant mechanical resonances of a system being driven by the stepper motor.

* * * * *